United States Patent Office 3,060,029
Patented Oct. 23, 1962

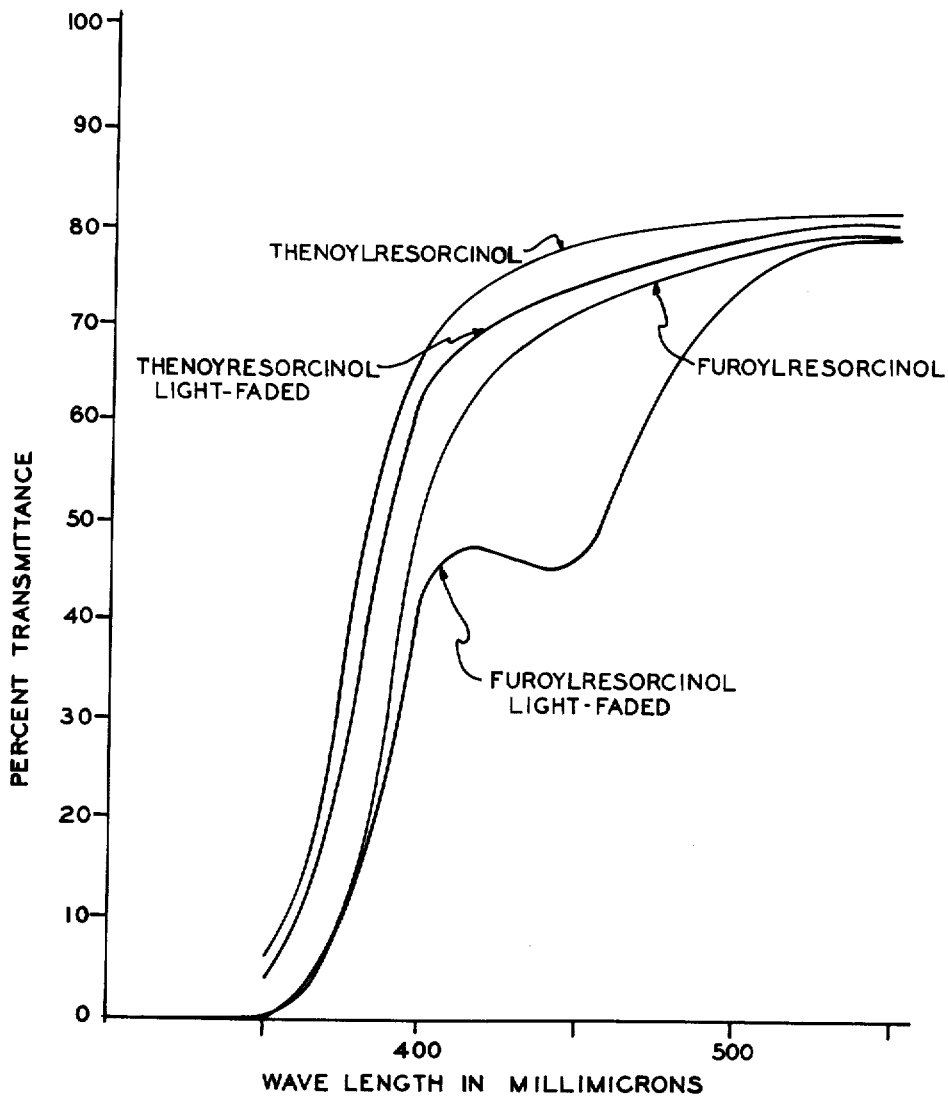

3,060,029
PHOTOGRAPHIC ULTRAVIOLET ABSORBERS
Edward Cerwonka, Binghamton, N.Y., assignor to General Aniline & Film Corporation, New York, N.Y., a corporation of Delaware
Filed Sept. 12, 1960, Ser. No. 55,425
15 Claims. (Cl. 96—77)

This invention relates to ultraviolet absorbing compounds and to compositions of matter containing the same which are adapted to protect organic materials from decomposition and discoloration by exposure to ultraviolet light. More particularly, this invention relates to the protection of photographic color images against fading caused by ultraviolet light.

Many organic substances are not entirely immune from the effects of ultraviolet light. As a consequence, various colored objects will fade when exposed for prolonged periods to the effect of sunlight. This fading is especially noticeable on those colored articles having relatively thin cross-sections; such as, dyed organic fibers and, particularly, photographic color pictures which bleach and decolorize rather rapidly when subjected to the effects of the ultraviolet light present in sunlight.

It is already known that organic plastics, resins, film-forming materials and the like become colored, brittle and eventually deteriorate when exposed to sunlight. In order to vitiate the deleterious and damaging effect of sunlight upon these plastics and other materials, it was proposed by the prior art to incorporate in such plastics suitable stabilizers which absorb ultraviolet light. These stabilizers include:

Resacetophenone (2,4-dihydroxyacetophenone)
2,4'-dihydroxybenzophenone
Bis-p-hydroxyphenylketone (4,4'-dihydroxybenzophenone)
4-benzoylresorcinol (2,4-dihydroxybenzophenone)
4-(2'-furoyl)resorcinol (2,4-dihydroxybenzoylfurane)

Although the foregoing compounds inhibit the physical breakdown of the plastics and other material in which they are incorporated, most of them are unsatisfactory as protective agents against ultraviolet fading when employed in water-white or substantially colorless carrier materials for the formation of ultraviolet absorbing layers for colored materials. In some cases, the originally colorless filter layer used to protect the color pictures turns yellow on storage and distorts the color balance of the picture it is designed to protect. In other cases, the originally clear and colorless ultraviolet absorbing layer present in a color film turns yellow either immediately after being submitted to the usual photographic processing treatment or within a few days' exposure to daylight.

It is accordingly an object of the present invention to provide an ultraviolet absorbing composition of matter comprising a light transmitting carrier having uniformly dispersed therein a novel ultraviolet light absorbing agent.

A further object of this invention is to provide ultraviolet absorbing layers for photographic color materials having incorporated in such layers in an anti-fading amount a novel ultraviolet light absorbing agent.

Other objects and features of the invention will be apparent from the following description.

The above objects are attained by incorporating into any organic water-white or substantially colorless light transmitting carrier material capable of forming a film, filter layer or foil, and an ultraviolet absorbing amount of a 4-(2'-thenoyl)resorcinol. These novel compositions are unique because they not only exhibit unusual ultraviolet light absorbing characteristics but also display an outstanding stability to color change when subjected to the action of chemical agents.

These ultraviolet absorbing agents are characterized by the following general formula:

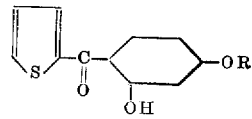

wherein R is a hydrogen atom or a lower alkyl group such as methyl, ethyl, propyl or isopropyl.

The following are examples of suitable thenoylresorcinols characterized by the above formula:

1,3-dihydroxy-4-(2'-thenoyl)-benzene; i.e., 4-(2'-thenoyl)resorcinol
3-hydroxy-1-methoxy-4-(2'-thenoyl)-benzene
3-hydroxy-1-ethoxy-4-(2'-thenoyl)-benzene
3-hydroxy-1-propoxy-4-(2'-thenoyl)-benzene The compounds which I use can be incorporated in a wide variety of organic carrier materials particularly compositions which are water-white or substantially colorless, including film-forming plastics, resins, waxes and the like.

The thenoylresorcinols may be incorporated into solutions or dopes of film-forming materials by forming a solution of the thenoylresorcinol in a suitable solvent mutually compatible with the dope, casting, coating or otherwise treating this solution to form a sheet or foil and, finally, driving off the solvent. The thenoylresorcinols can also be added to polymerizable organic materials which are capable of forming water-white or substantially colorless films or foils.

The 4-thenoylresorcinols can be advantageously introduced into the various substantially colorless resinous and film-forming materials which are normally cast from solutions, extruded, or laminated into sheets, films and foils. Such film-forming materials include urea-formaldehyde resins, phenol-formaldehyde resins, melamine-formaldehyde resins, polystyrene, acrylates and methacrylate resins, polymers and copolymers of vinyl chloride, polymers of vinylidene chloride, polyvinyl acetate, polyvinyl butyral, partially hydrolyzed polyvinyl derivatives, cellulose esters, such as cellulose nitrate, cellulose acetate, cellulose propionate, cellulose butyrate, cellulose acetate-propionate or cellulose acetate-butyrate, and cellulose ethers such as methyl cellulose or ethyl cellulose.

The amount of thenoylresorcinol to be employed in the foregoing materials is not critical, and the actual concentration to be employed may be very readily determined by a simple trial experiment. It will be appreciated that each type of material may require an amount which will differ from a closely analogous material. For practical purposes, I have found that the amount may range from 0.1 percent to 5 percent based on the dry weight of the plastic, resinous or film-forming material.

The thenoylresorcinols can also be employed in paints, enamels and varnishes to give protection against fading of dyes or pigments in drying oils, in waxes such as beeswax, carnauba wax, etc., and in polishing compositions containing the same such as automobile polishes, floor waxes and the like to protect the wax coating itself or the colored or dyed coated surface from degradation and discoloration.

The quantity of the compound to be employed in such paints, lacquers, waxes and wax compositions may range from 5 to 15 percent. However, the actual amount to be employed will depend, of course, upon the material or composition itself and can be very readily determined by simple trial experiments.

Due to the fact that the thenoylresorcinols and the layers in which they are dispersed remain colorless even when subjected to the actions of photographic processing solutions, they are valuable ultraviolet absorbing substances for use in color photography. By incorporating the thenoylresorcinols into the surface coating or supercoat of an unexposed color material, the latter is permanently protected against the effects of ultraviolet light not only during the instant of photographic exposure but also for long and extended periods of storage after completed color development.

In the preparation of the surface coating for the color film, it is preferred to dissolve the thenoylresorcinol first in an organic solvent or solvent mixture and then to incorporate the resulting solution into the solution or dispersion of a suitable colloidal carrier. The dispersion obtained is applied over the emulsion layer of a monolayer material or over the top layer of a multilayer color material.

The addition products may be incorporated in gelatin or other colloidal materials such as organic esters of cellulose or synthetic resins such as partially hydrolyzed polyvinyl esters, polyvinyl alcohol mixed with resorcinol, polyvinyl propionaldehyde and the like. A surface active agent such as saponin or one of the synthetic surfactants including sulfonated oleic acid, alkylated monosodium benzene sulfonate, the sodium salt of tetrahydronaphthalene sulfonic acid, calcium glycerin phosphate, alkylphenylpolyethylene glycol, cycloaliphatic carboxy acids may be added to effect a smoother coating. It is to be noted that any commercially available surface active agent may be employed so long as it possesses wetting, spreading, and, preferably, some dispersing and emulsifying properties and so long as its aqueous solutions are colorless or only slightly tinted. The colloids are applied in the form of solutions or dispersions in concentrations ranging from 0.5 to 5.0 percent. Aqueous solutions or dispersions are preferred because of their ease of application.

The proportions of the thenoylresorcinol which may be incorporated into the surface coating or supercoat are not critical, and the amounts employed will depend on the amount of material used and the final thickness of the surface coating. For practical purposes, I have found that the amounts of thenoylresorcinol employed may range from 0.5 to 10.0 grams per liter of aqueous coating solution which may contain from 5 to 50 grams of colloidal carrier material. One square foot of overcoated color material will be covered by approximately 15 to 500 milligrams of the thenoylresorcinol. The actual concentration used will depend somewhat on the type of color material, but the most practical concentrations can be very readily determined by routine experiments.

Among the photographic multicolor materials which may be surface coated with the ultraviolet absorbing layers are color reversible film, color printing material coated on an opaque base and color positive paper. In these materials, the final dye images are produced with dye image intermediates such as color formers already present in the emulsion for the unexposed materials.

These dye forming components or color formers unite during the development of the silver image in a primary aromatic amine developing agent to form azomethine, indoaniline or azine dyes with the oxidation product of the developing agent.

However, dye images may be produced by the utilization of selective second exposure followed by development with developing solutions containing color formers and color developing agents as described in United States Patents 1,897,866, 1,900,870, 1,928,709 and 1,980,941. Still other dye images may be produced by the use of bleachable azo dyes present in the emulsion.

The following specific examples illustrate the synthesis of the novel compounds of this invention and their use in photographic materials. It is to be understood, however, that these examples are given by way of illustration and not by way of limitation.

*Example I*

This example illustrates the preparation of 4-(2'-thenoyl)resorcinol:

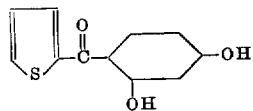

In a 1,000-milliliter, three-necked flask equipped with a stirrer and inlet tube and protected from moisture by a calcium chloride tube were placed 55 grams of resorcinol (0.5 mole), 64 grams of thiophene-2-carboxylic acid (0.5 mole) and 125 milliliters of tetrachloroethane. Gaseous boron fluoride was passed into the mixture until the increase in weight was 45 grams.

The mixture was stirred and heated on the steam bath for 4 hours, then poured into 750 milliliters of water containing 229 grams of sodium acetate trihydrate. Two portions, 400 milliliters each of 1-N-sodium hydroxide, were used to extract the tetrachloroethane layer; a third portion of 450 milliliters of sodium hydroxide was used for a final extraction and to dissolve the precipitate (about ten grams) which had been filtered off. Carbon dioxide was passed into the alkaline solutions until the pH dropped to 8.0. The precipitate was filtered and dried. The yield of crude dry product was 45 grams (40.9 percent), melting at 124 to 126° C. After two recrystallizations from hot benzene, the product melted at 126–127° C. and 23 grams of pure product were obtained.

Analytical data obtained for $C_{11}H_8O_3S$ were:

[Percent]

| Calculated | | Found | |
|---|---|---|---|
| C | 59.98 | C | 60.12 |
| H | 3.66 | H | 3.76 |
| S | 14.50 | S | 14.64 |

*Example II*

This example illustrates the preparation of 1-methoxy-3-hydroxy-4-(2'-thenoyl)-benzene:

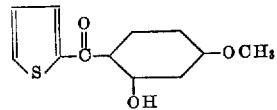

In a flask, as described in Example I, were placed 69 grams of resorcinol dimethyl ether (0.5 mole) and tetrachloroethane (125 milliliters). Gaseous boron fluoride was passed into the mixture until the increase in weight was 45 grams. The mixture was stirred and heated on the steam bath for four hours during which time the ortho methoxy group was split off. The mixture was then poured into a sodium acetate solution, filtered and the tetrachloroethane layer extracted twice with 400 milliliter portions of one normal sodium hydroxide solution. A third portion of alkali (450 milliliters) was used for a final extraction and used to dissolve the precipitate (90 grams) which had been filtered off. Carbon dioxide was then passed into the combined alkaline solutions until the pH dropped to 9.4. The precipitate was filtered and dried. The yield of crude, dry product was 45.6 grams (39.0 percent) melting at 86–87° C. After two recrystallizations from normal heptane, the product melted at 85–86° C. The yield of pure product was 23.4 grams.

Analytical data obtained for $C_{12}H_{10}O_3S$ are:

[Percent]

| Calculated | | Found | |
|---|---|---|---|
| C | 61.52 | C | 61.24 |
| H | 4.37 | H | 4.28 |
| S | 13.07 | S | 13.25 |

Example III

Ten grams of 4-(2'-thenoyl)resorcinol were dissolved in 100 milliliters of a solvent mixture having the following composition:

| | Percent |
|---|---|
| Phenethyl alcohol | 50 |
| Tricresyl phosphate | 40 |
| Dibutyl phthalate | 10 |

(Proportions by volume.)

The above solution was then dispersed in 900 milliliters of a 4 percent aqueous gelatin solution. The dispersion thus produced was coated on clear film base and dried.

The coatings upon testing were found to have a light transmission of 10 percent at 350 m$\mu$ and 70 percent at 400 m$\mu$. The novel compound did not wash out in the processing baths for color film, and the layer remained clear after processing and was completely stable upon exposure for 20 hours in a Fade-O-Meter. A comparison test using 4-(2'-furoyl)resorcinol as the ultraviolet absorbing agent and gelatin as the film-forming colloidal carrier material showed pronounced yellowing during the test.

Example IV

Example III was repeated with the exception that 10 grams of 3-hydroxy-1-methoxy-4-(2'-thenoyl)-benzene [thenoyl-resorcinol monomethyl ether] were used in place of thenoylresorcinol. The results obtained were essentially identical to those described in Example III.

Example V

A multilayer color reversible duplicating material on a cellulose acetate film base prepared according to the methods described in United States Patents 2,179,228, 2,179,239, 2,186,849 and 2,220,187 was selected for this test. Each of the three integrally coated emulsion layers was sensitized to one of the primary colors of light; namely, blue, green and red. The top layer was blue sensitive and contained a color former for the yellow image. The middle layer was green sensitive and contained a color former for the magenta image; the bottom layer was red sensitive and contained a color former for the cyan image. A yellow filter layer separated the blue and green sensitive layers. Ten square feet of this material was divided into two equal sections. One of them was overcoated in total darkness with a surface layer obtained by dispersing 4-(2'-thenoyl)resorcinol in gelatin as described in Example III. The other section was surface coated with an aqueous gelatin dispersion of 4-(2'-furoyl)resorcinol. Both samples were allowed to dry, exposed to the same color transparency and subsequently developed for 14 minutes at 68° F. in a developer of the following composition:

| | Grams |
|---|---|
| 4-methylaminophenol sulfate | 30 |
| Sodium sulfite | 50 |
| Hydroquinone | 6 |
| Sodium carbonate | 40 |
| Sodium thiocyanate | 2 |
| Potassium bromide | 2 |
| Water to make 1 liter. | |

The developed film was short-stopped for 2 minutes in a bath of the following composition:

| | Grams |
|---|---|
| Acetic acid | 10 |
| Sodium acetate | 20 |
| Water to make 1 liter. | |

The material was then hardened for 5 minutes in a 3 percent aqueous solution of potassium chrome alum and washed in water for 3 minutes.

The washed film was given a second exposure for 3 minutes to the light of a #1 photoflood lamp thirty inches away from the film and color developed for 15 minutes in a developer of the following composition:

| | Grams |
|---|---|
| Sodium sulfite | 2.0 |
| p-Aminodiethylaniline hydrochloride | 4.0 |
| Sodium carbonate (monohydrate) | 67.5 |
| Potassium bromide | 1.0 |
| Water to make 1.0 liter. | |

The film was then short-stopped for 1 minute, hardened for 3 minutes, washed in water for 5 minutes and bleached for 10 minutes in an aqueous solution containing 6 percent potassium ferricyanide, 1.5 percent potassium bromide and 2 percent sodium phosphate-sodium bisulfate buffer. The bleached film was washer in water for 5 minutes, fixed for 5 minutes in a 20 percent aqueous hypo solution, washed in running water for an additional 5 minutes and then dried.

Both films were then subjected to fading tests by taping them for one week to a window with southern exposure. The film which had been protected with the 4-(2'-thenoyl) resorcinol did not show any signs of yellowing or fading whereas the film containing the 4-(2'-furoyl)resorcinol in the protective layer showed pronounced yellowing and considerable discoloration.

Example VI

Example V was repeated with the exception that thenoylresorcinol monomethyl ether was used in place of thenoylresorcinol. The film overcoated with the thenoylresorcinol monomethyl ether was adequately protected against light fading whereas the film overcoated with the furoylresorcinol showed pronounced yellowing and noticeable discoloration.

The invention is further illustrated by the accompanying drawing which shows the transmittance curves of coatings of 4-(2'-furoyl)resorcinol and of 4-(2'-thenoyl)resorcinol which had been subjected to treatment with photographic color processing solutions. Another set of curves shows the transmittance of these processed coatings after a prolonged fading test with ultraviolet light.

Modifications will appear to persons skilled in the art. I do not intend tot be limited in the patent granted except as necessitated by the appended claims.

I claim:

1. An ultraviolet absorbing composition of matter comprising a light-transmitting colloidal carrier having uniformly dispersed therein in an ultraviolet absorbing amount a compound of the following formula:

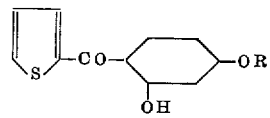

wherein R is a member selected from the class consisting of hydrogen and lower alkyl.

2. An ultraviolet absorbing composition of matter comprising a light-transmitting colloidal carrier having uniformly dispersed therein in an ultraviolet absorbing amount 4-(2'-thenoyl)resorcinol.

3. An ultraviolet absorbing composition of matter comprising a light-transmitting carrier having incorporated therein in an ultraviolet absorbing amount 3-hydroxy-1-methoxy-4-(2'-thenoyl)-benzene.

4. An ultraviolet absorbing composition of matter comprising a light-transmitting carrier having incorporated therein in an ultraviolet absorbing amount 3-hydroxy-1-ethoxy-4-(2'-thenoyl)-benzene.

5. An ultraviolet absorbing composition of matter comprising a light-transmitting carrier having incorporated therein in an ultraviolet absorbing amount 3-hydroxy-1-propoxy-4-(2'-thenoyl)-benzene.

6. An ultraviolet absorbing composition of matter comprising gelatin having uniformly dispersed therein in an ultraviolet absorbing amount, 4-(2'-thenoyl)resorcinol.

7. An ultraviolet absorbing composition of matter comprising gelatin having uniformly dispersed therein in an ultraviolet absorbing amount, 3-hydroxy-1-methoxy-4-(2'-thenoyl)-benzene.

8. An ultraviolet absorbing composition of matter comprising gelatin having uniformly dispersed therein in an ultraviolet absorbing amount, 3 - hydroxy - 1 - ethoxy - 4-(2'-thenoyl)-benzene.

9. An ultraviolet absorbing composition of matter comprising gelatin having uniformly dispersed therein in an ultraviolett absorbing amount, 3-hydroxy - 1 - propoxy-4-(2'-thenoyl)-benzene.

10. A photographic element comprising a support and at least one light-sensitive silver halide emulsion layer containing at least one dye image intermediate selected from the group consisting of colorless and colored color formers reactable with the oxidation products of an aromatic amine developer to form a dye image, the uppermost layer of said element being provided with a colloidal surface coating comprising a colloidal carrier material having dispersed therein in an ultraviolet absorbing amount a compound of the following formula:

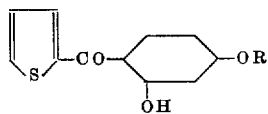

wherein R represents a member selected from the class consisting of hydrogen and lower alkyl.

11. A photographic material according to claim 6 wherein said ultraviolet absorbing amount is on the order of from 15 to 500 milligrams of said compound per square foot of overcoated film and from 0.5 to 10 grams of said compound per from 5 to 50 grams of colloidal carrier material.

12. A photographic element according to claim 10 wherein said compound is 4-(2'-thenoyl)resorcinol.

13. A photographic element according to claim 10 wherein said compound is 3 - hydroxy - 1 - methoxy - 4-(2'-thenoyl)-benzene.

14. A photographic element according to claim 10 wherein said compound is 3-hydroxy-1-ethoxy-4-(2'-thenoyl)-benzene.

15. A photographic element according to claim 10 wherein said compound is 3 - hydroxy - 1 - propoxy - 4-(2'-thenoyl)-benzene.

References Cited in the file of this patent

UNITED STATES PATENTS

| | | |
|---|---|---|
| 2,104,492 | Merkel et al. | Jan. 4, 1938 |
| 2,719,086 | Sawdey et al. | Sept. 27, 1955 |
| 2,808,330 | Sawdey | Oct. 1, 1957 |
| 2,965,578 | Pestemer et al. | Dec. 20, 1960 |
| 2,976,259 | Hardy et al. | Mar. 21, 1961 |